(12) United States Patent
Stav et al.

(10) Patent No.: US 6,197,107 B1
(45) Date of Patent: Mar. 6, 2001

(54) GYPSUM-RICH PORTLAND CEMENT

(75) Inventors: Elisha Stav, Kfar Tavor; Meir Gamliel Goldgraber, Netanya, both of (IL)

(73) Assignee: M. Gold Investments (1999) Ltd., Netanya (IL)

( * ) Notice: Subject to any disclaimer, the term of this patent is extended or adjusted under 35 U.S.C. 154(b) by 0 days.

(21) Appl. No.: 09/538,217

(22) Filed: Mar. 30, 2000

Related U.S. Application Data

(63) Continuation-in-part of application No. 09/394,322, filed on Sep. 13, 1999, now abandoned.

(51) Int. Cl.[7] .............................. C04B 11/30; C04B 7/04; C04B 14/10
(52) U.S. Cl. .................. 106/722; 106/718; 106/721; 106/735; 106/773; 106/788
(58) Field of Search .................... 106/718, 722, 106/721, 735, 773, 788

(56) References Cited

U.S. PATENT DOCUMENTS

| | | | | |
|---|---|---|---|---|
| 4,443,260 | * | 4/1984 | Miyoshi et al. | 106/715 |
| 5,569,324 | * | 10/1996 | Totten et al. | 106/696 |
| 5,858,083 | * | 1/1999 | Stav et al. | 106/735 |
| 5,958,131 | * | 9/1999 | Asbridge et al. | 106/722 |

FOREIGN PATENT DOCUMENTS

| | | | | |
|---|---|---|---|---|
| 1 171 793 | * | 6/1964 | (DE) | 106/722 |
| 55-003325 | * | 1/1980 | (JP). | |

OTHER PUBLICATIONS

Derwent Abstract No. 1987–306015, abstract of Soviet Union Patent Specification No. 1301806 (Apr. 1987).*

* cited by examiner

Primary Examiner—Anthony Green
(74) Attorney, Agent, or Firm—Mark M. Friedman

(57) ABSTRACT

The present invention is of a cementitious composition containing OPC, calcined gypsum, a source of amorphous silica and a source of amorphous alumina. The ratio of calcium sulfate hemihydrate to OPC is 0.7:1.0 to 1.4:1.0, the ratio of amorphous silica and amorphous alumina to OPC is 0.26:1.0 to 0.4:1.0, and the ratio of amorphous alumina to amorphous silica is 0.3:1.0 to 1.5:1.0. The cementitious composition, by itself and mixed with aggregates, is fast-setting and exhibits good early compressive strength and very high compressive strength after hydration. Despite the high content of calcium sulfate relative to prior art OPC formulations, the cementitious composition according to the present invention is essentially waterproof and exhibits excellent strength characteristics, even after 2 years under water. The use of calcined gypsum in place of alumina cement or even OPC is of great economic advantage, and in addition, provides the cementitious composition with quick-setting characteristics.

14 Claims, 12 Drawing Sheets

FIG. 1

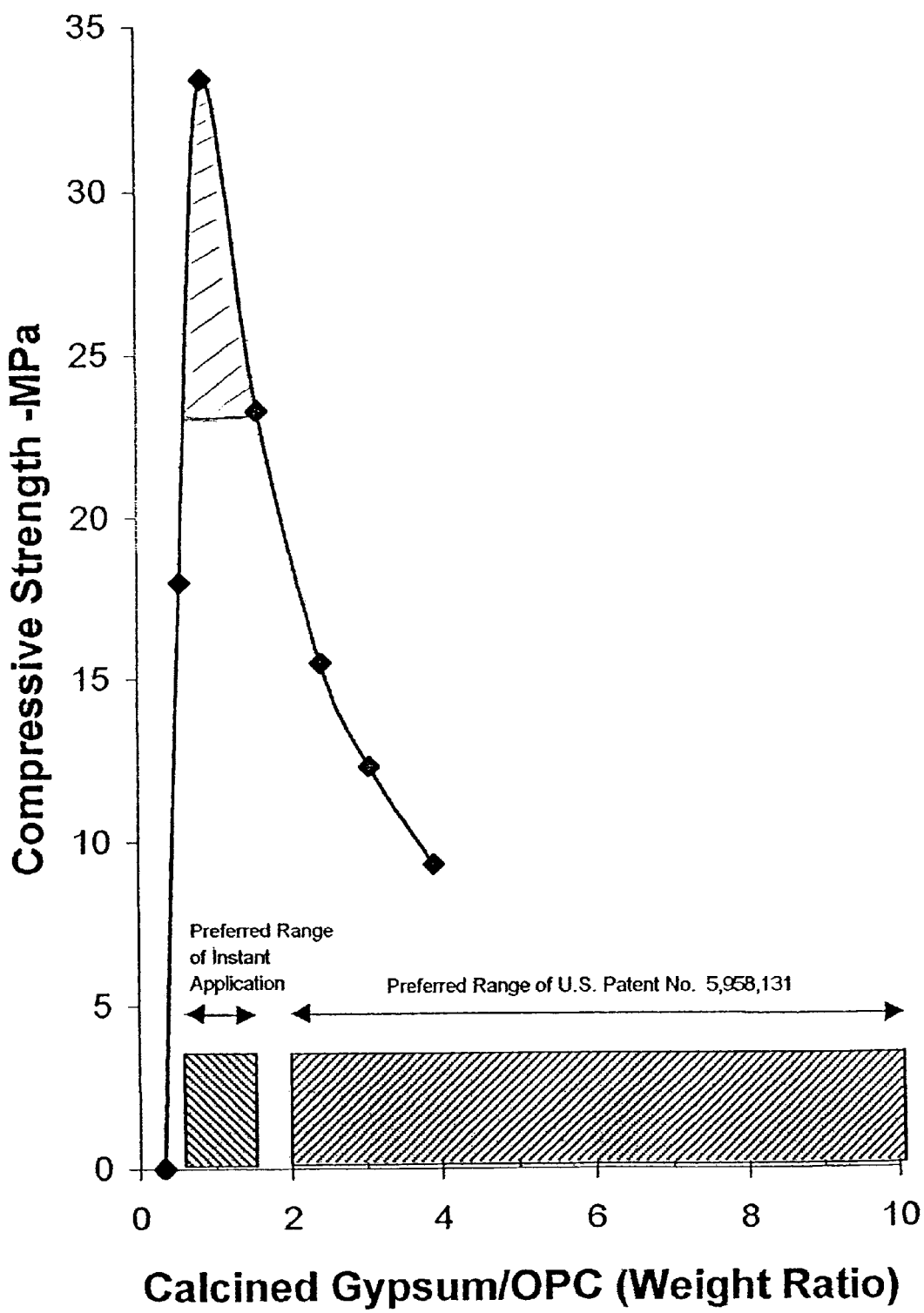

GYPSUM-RICH PORTLAND CEMENT

This is a continuation-in-part of U.S. patent application Ser. No. 09/394,322, filed Sep. 13, 1999, now abandoned.

FIELD AND BACKGROUND OF THE INVENTION

The present invention relates generally to cementitious compositions and, in particular, to gypsum-containing cementitious construction materials for high strength concrete, blocks, grout, floor underlayments, road-patching materials, backer boards, fiberboard and roofing tiles.

Ordinary Portland cement (OPC) is the main cementitious material of the building industry. It is the main binder in concrete blocks, roofing tiles, grouts, fiberboard, mortar, tile adhesives, etc. Disadvantages OPC include low early strength and high shrinkage on drying.

Gypsum ($CaSO_4.2H_2O$) is an inexpensive, available material that is commonly used as an additive for OPC and for the production of gypsum-based products such as plasterboard, fiberboard, plaster, etc. Calcined gypsum, (calcium sulfate hemihydrate—$CaSO_4.\frac{1}{2}H_2O$) forms gypsum upon wetting and sets within minutes, displaying excellent early-strength characteristics. The set gypsum has very low strength relative to OPC. In addition, the solubility of gypsum in water (2 g/l), along with high porosity, gives the material poor water-resistance.

Attempts to improve the water-resistance of gypsum boards by mixing Portland cement and calcined gypsum have met with limited success because of ettringite ($3CaO.Al_2O_3.CaSO_4.32H_2O$) formation. It is known that a major factor in the long-term deterioration of concrete is the formation of ettringite. This results from the reaction of tricalcium aluminate ($3CaO.Al_2O_3$) present in OPC with sulfate. The formation of ettringite increases the volume of the concrete, causing splitting, cracking and crumbling. Although mixtures of OPC and calcined gypsum have previously been used and are in some cases advantageous, the interaction between the tricalcium aluminate and the sulfate has greatly limited the use of such mixtures. Their application has been primarily as "quick patches", which are known to be of poor long-term durability.

Much work has been focused on inhibiting the formation of ettringite. To this end, U.S. Pat. No. 3,852,051 deals with special formulations of Portland cement having low concentrations of tricalcium aluminate. Such formulations are expensive, however, and exhibit low ultimate compressive strength.

U.S. Pat. No. 4,494,990 to Harris discloses a cementitious composition containing OPC and alpha gypsum. The composition also includes a pozzolan source, such as silica fume, fly ash or blast-furnace slag. The Harris patent teaches that the pozzolan blocks the interaction between the tricalcium aluminate and the sulfate in the gypsum.

U.S. Pat. No. 4,661,159 discloses a floor underlayment composition that includes calcium sulfate alpha-hemihydrate (alpha gypsum), calcium sulfate beta-hemihydrate (beta gypsum), fly ash, and Portland cement. The patent also discloses that the floor underlayment material can be used with water and sand or other aggregate to produce a fluid mixture that may be applied to a substrate.

A cementitious composition useful for water-resistant construction materials is disclosed in U.S. Pat. No. 5,685,903 to Stav, et al. The composition includes beta gypsum, OPC, silica fume, and pozzolanic aggregate as filler. The OPC component may also contain fly ash and/or ground blast slag.

U.S. Pat. No. 5,685,903 teaches that the silica fume component is an extremely active pozzolan that prevents the formation of ettringite. It is further disclosed that compositions according to the invention that include both a pozzolanic aggregate and a finely divided pozzolan result in cementitious materials in which the transition zone between the aggregate and a cement paste is densified and thus produces a cured product of higher compressive strength than compositions which utilize a pozzolanic aggregate alone or a finely-divided pozzolan alone.

It is believed that the mechanism which causes changes in the microstructure of compositions according to the invention to result in higher compressive strengths is associated with two effects: 1) a pozzolanic effect in which the surfaces of the pozzolanic aggregate react with free lime to form calcium silicate hydrate (CSH) which becomes part of the product matrix: 2) a microfiller effect due to the fine size and spherical shape of the silica fume.

A cementitious binder composition useful for water-resistant, high-strength construction materials is disclosed by Stav, et al. in U.S. Pat. No. 5,858,083. The binder includes calcium sulfate beta-hemihydrate, a cement component comprising Portland cement, and either silica fume or rice-husk ash. The silica fume or rice-husk ash component is at least about 92% amorphous silica and has an alumina content of about 0.6 wt. % or less.

According to U.S. Pat. No. 5,858,083, the silica fume component is an extremely active pozzolan and prevents the formation of ettringite. The silica fume component includes at most 0.6 wt. % alumina in the form of aluminum oxide. U.S. Pat. No. 5,858,083 cites Malhotra, M., and Mehta, P. Kumar, *Pozzolanic and Cementitious Materials, Advances in Concrete Technology,* Vol. 1, who report typical oxide analyses of silicon fumes made from the ferrosilicon alloy industry having $SiO_2$ amounts of as low as 83% and $Al_2O_3$ amounts from between 1.00% and 2.5%. Oxide analyses of certain North American blast-furnace slags have $SiO_2$ amounts of as low as 33% and $Al_2O_3$ amounts as high as 10.8%. U.S. Pat. No. 5,858,083 concludes that not all pozzolans, and specifically, not all silica fumes, are acceptable for use according to the invention.

In all of the above-mentioned patents, methods have been developed for preventing the formation of ettringite. However, the prior art teaches that the formation of ettringite can actually be beneficial to cementitious material improving the compressive strength in the early stages.

The role of ettringite in expansive cements is related in U.S. Pat. No. 4,255,398. It is taught that ettringite should be precipitated on the surface of solids already present, and not from the liquid phase during cement hydration.

In *Cement and Concrete Research,* (Vol. 26, No.3), Singh and Garg report on the properties of a gypsum-based binder containing portland cement, calcined phosphogypsum, ground granulated slag and an organic retarder. The physical properties of the blended gypsum binder are compared with those of plain gypsum plaster. The superior behavior of the blended gypsum binder to water is attributed to the filling of voids and pores of the gypsum matrix with ettringite and CSH. The improvement of compressive strength of the blended gypsum binder over the 28-day test period is ascribed to the filling of the matrix with ettringite and tobermorite. The problems associated with late ettringite formation are not dealt with.

In *Material Science of Concrete,* Lawrence surveys and summarizes the topic of delayed ettringite formation (DEF). Based on extensive experimental investigations in the literature, the author teaches that correlation between expansions of siliceous sand mortars and the chemical composition of OPC indicate the importance of the sulfate level in the cement: where the sulfate level of a cement showing expansion has been increased by the addition of $CaSO_4$ or $Na_2SO_4$, the final expansion is increased. Added fly ash, blast furnace slag, or microsilica tends to reduce the expansions. This conclusion is supported by the work of Stav et al. (U.S. Pat. No. 5,858,083) for pozzolanic materials containing at most 0.6 wt. % alumina in the form of aluminum oxide. Higher levels of aluminum oxide promote DEF expansion, causing long-term deterioration of OPC.

U.S. Pat. No. 4,350,533 to Galer et al. discloses a cementitious composition containing high-alumina cement, calcium sulfate, and Portland cement and/or lime. The reaction is rapid, and the only significant factor contributing to strength during the very early stages of hydration (i.e., a few minutes to a few hours) is the formation of ettringite. Portland cement is not a necessary component of the composition and can be replaced by lime. A pozzolanic material such as montmorillonite clay, diatomaceous earth, pumice, and fly ash may be included in the cement powder as an optional ingredient. When used, it usually replaces part or all of the Portland cement.

High alumina cement, known also as Calcium Aluminate Cement, has an alumina content of 36–42%, the bulk of which is in the form of various calcium aluminates. Calcium aluminate cements containing high levels of sulfate are known for their susceptibility to DEF and to deterioration over the long-term. A commercial disclosure of LaFarge Fondu International A.S. reports that the addition of calcium sulfate to calcium aluminate cement should be limited to a maximum of 15–20% $SO_3$ (25–34% calcium sulfate) to avoid excessive expansion which could disrupt the material.

U.S. Pat. No. 5,788,762 to Barger et al. discloses cementitious compositions comprised of gypsum ($CaSO_4.2H_2O$), calcined clay and clinker. Novel methods of preparing these compositions are also disclosed. The pozzolanic material, calcined clay, has specified Fe and quartz contents, and contains kaolinites, montmorillonites, illites, halloysites, and mixtures thereof. The cementitious systems disclosed have a water demand of less than about 33%, one-day strengths of at least 1000 PSI, and low alkali functionality. However, the cementitious compositions reported are not fast-setting and have early compressive strengths that are comparable to those of ordinary Portland cements. U.S. Pat. No. 5,788,762 reports that an advantage of the novel cementitious system disclosed therein is that it allows for the addition of more gypsum than is normally added to the cement clinker, such that the calcium sulfate component amounts to 4–10 wt. % of the cementitious mixture.

It would be advantageous to formulate a material that is fast-setting, like that of U.S. Pat. No. 4,350,533 to Galer et al., but based on OPC. Calcium aluminate cement is expensive and has different chemical and physical properties from OPC, including a lower ultimate compressive strength and susceptibility to cracking and crumbling. It would be of further advantage to utilize controlled ettringite formation to improve the compressive strength of the cementitious material relative to known compositions, including those that block the formation of ettringite. It would also be of advantage to formulate a water-resistant material, which does not suffer from late-ettringite formation, such that the cement does not swell and crack over the long term, even in the presence of water. Finally, it would be of advantage to use significantly higher amounts of calcium sulfate in the cementitious mixture relative to prior art formulations, without compromising the ultimate compressive strength and without reducing the resistance to water.

U.S. Pat. No. 5,958,131 to Asbridge et al. discloses water-resistant cementitious compositions comprising calcium sulfate hemihydrate, portland cement and calcined clay, for use in applications in which water-resistance, good surface finish and a rapid gain in strength in the early stages following application are important.

It is taught therein that a hydrated mixture of calcium sulfate hemihydrate and portland cement might be expected to give the advantages of each of these two cementitious materials, however, deleterious chemical reactions occur between sulfate ions, which are supplied principally by the calcium sulfate, and aluminum compounds in the hydrated portland cement. For example, tricalcium aluminate and hydrated calcium aluminosulfate produce ettringite, a hydrated calcium aluminosulfate of large crystal volume. The expansive, forces introduced into a hardened cementitious product by the formation of ettringite can cause cracking and subsequent terminal deterioration of the product.

According to U.S. Pat. No. 5,958,131, the inclusion of calcined clay having a pozzolanic activity, e.g., metakaolin, in a cementitious composition, together with calcium sulfate hemihydrate and portland cement unexpectedly and beneficially is effective in rendering the composition more resistant to attack by water. While not wishing to be bound by any particular theory, the authors utilize well-known and established theory and attribute the water resistance to pozzolanic activity that consumes free lime and prevents the formation of ettringite. It is maintained by U.S. Pat. No. 5,958,131 to Asbridge et al. that the water resistance is achieved because of the reactivity of the calcined clay towards chemical compounds such as hydroxides of calcium and sodium and sulfates of calcium and sodium, which are produced during the hydration of mixtures of calcium sulfate hemihydrate and portland cement. Calcined clays such as metakaolin react with and immobilize chemical compounds that would otherwise take part in a reaction to form ettringite, which would cause expansion and deterioration of the hydrated hydraulic composition after setting.

It is further disclosed by U.S. Pat. No. 5,958,131 that properly hydrated hydraulic compositions in accordance with the invention exhibit, unexpectedly and beneficially, good workability in the wet state, develop strength in a relatively short time after setting, produce cast articles with good surface finish, and can have good long term stability and resistance to attack by water.

The role of the calcined clay according to U.S. Pat. No. 5,958,131 is the reactivity with hydroxides and the like, such that the formation of ettringite is prevented. This is strikingly similar to U.S. Pat. No. 4,494,990 to Harris, described above, which discloses a cementitious composition containing OPC, calcined gypsum, and a pozzolan source, such as silica fume, fly ash or blast-furnace slag.

The authors of U.S. Pat. No. 5,958,131 do not relate to the amorphous alumina component of calcined clay and its role in the chemical/physical development of the cement and in the physical properties of the cementitious material (strength, water resistance, etc.). This is also evident from the index of performance for metakaolin and other calcined clays that has been chosen and defined in said patent: reactivity with lime (the pozzolanic reaction). As both siliceous and aluminous materials react with lime, theoretically speaking, the calcined clay could contain solely siliceous or solely aluminous material. No ratio of siliceous/aluminous material is defined.

Moreover, U.S. Pat. No. 5,958,131 to Asbridge et al. claims water-resistance over an extremely wide range of percentages and ratios of OPC, hemihydrate, and calcined clay. The cementitious compositions disclosed that are deemed suitable for adding to water to form a water-resistant hydraulic solid composition comprise from 20% to 98% by weight of calcium sulfate hemihydrate, from 1% to 50% by weight of portland cement, and from 1% to 30% by weight of calcined clay having pozzolanic activity (e.g., metakaolin). The preferred ratio of hemihydrate to OPC is in the range of 2:1 to 10:1; the preferred ratio of OPC to calcined clay is in the range of 2:1 to 10:1. The proportion of calcium sulfate hemihydrate is preferably in the range of from 47.5% to 91% by weight, the proportion of portland cement is preferably in the range of from 7% to 40% by weight, and the proportion of calcined clay is preferably in the range of from 2% to 12.5% by weight.

SUMMARY OF THE INVENTION

It is an object of the present invention to provide a cementitious composition that is essentially waterproof, such that the compressive strength, even under prolonged exposure to water (i.e., at least ½ year to 2 years) increases or remains substantially constant.

It is another object of the present invention to provide a cementitious composition which, by itself or mixed with aggregates such as sand, is fast-setting, exhibiting good early compressive strength within the first hour; good medium-term strength, that is, within 7–28 days; and very high late compressive strength; that is, after at least 28 days and typically 6 months or more of curing.

It has been found that for cementitious mixtures comprising calcined gypsum, OPC and pozzolanic materials, the optimal range of compositions for obtaining maximal compressive strength and water-resistance, and fast-setting properties is extremely narrow, and lies outside the preferred range of weights and ratios as specified by U.S. Pat. No. 5,958,131.

It has been found that true water resistance cannot be obtained with a calcined gypsum to OPC weight ratio of more than about 1.5 to 1. Although a sufficient amount of pozzolanic material in the cementitious mixture neutralizes the lime formed and may control the formation of ettringite and other expansive materials, cementitious mixtures having the preferred calcined gypsum to OPC weight ratios of 2 to 1 to 10 to 1, as disclosed by U.S. Pat. No. 5,958,131, are subject to dissolution and deterioration due to the relatively-high solubility of the exposed sulfate. Moreover, cementitious mixtures having calcined gypsum to OPC weight ratios of 2 to 1 to 10 to 1 do not enjoy the full compressive strength contribution of the cement hydration reaction.

It has also been found that cementitious mixtures containing OPC, calcined gypsum, and a source of amorphous silica and amorphous alumina require a calcined gypsum to OPC weight ratio of more than about 0.5 to 1 in order for the mixture to be fast setting.

The present invention provides a cementitious composition containing OPC (Types I, II, III, IV and white cement), calcined gypsum, a source of amorphous silica and a source of amorphous alumina in a particular ratio as delineated below. The cementitious composition by itself or mixed with aggregates such as sand, is fast-setting, exhibiting good early compressive strength within the first hour; good medium-term strength, that is, within 7–28 days; and very high late compressive strength; that is, compressive strength after at least 28 days and typically 6 months or more of curing.

Despite the high content of calcium sulfate relative to many other OPC formulations, the cementitious composition is essentially waterproof, and exhibits excellent strength characteristics. Even under exposure to water for at least ½ year to 2 years, the cementitious material shows dimensional stability, without any sign of splitting, cracking or crumbling. The use of calcined gypsum in place of alumina cement or even OPC is of great economic advantage, and in addition, provides the cementitious composition with quick-setting characteristics.

In a first embodiment, the cementitious binder of the present invention comprises OPC, calcium sulfate hemihydrate (beta or alpha or both), a source of amorphous silica and a source of amorphous alumina, wherein the ratio of calcium sulfate hemihydrate to OPC is 0.7–1.4, the ratio of amorphous silica and amorphous alumina to OPC is 0.26–0.4, and the ratio of amorphous alumina to amorphous silica is 0.3–1.5.

Preferably. the ratio of calcium sulfate hemihydrate to OPC is 0.75–1.1, the ratio of amorphous silica and amorphous alumina to OPC is 0.3–0.35, and the ratio of amorphous alumina to amorphous silica is 0.6–1.2.

In another preferred embodiment, the cementitious material further comprises 0–95% by weight of filler selected from a group consisting of pozzolanic aggregate, non-pozzolanic aggregate and fibers.

In a preferred embodiment, the cementitious binder of the present invention comprises about 35–55% by weight OPC, about 35–52% by weight calcium sulfate hemihydrate, about 5–12% by weight amorphous silica, and about 3–9% by weight amorphous alumina.

In another preferred embodiment, the cementitious binder further comprises filler selected from the group consisting of pozzolanic aggregate, non-pozzolanic aggregate, and fibers, to form a cementitious mixture containing up to about 95% by weight of filler.

In another preferred embodiment, metakaolin is utilized as a source of amorphous silica and as a source of amorphous alumina.

In another preferred embodiment, the source of amorphous silica and the source of amorphous alumina includes calcined clay.

In another preferred embodiment, amorphous silica is provided from materials selected from the group consisting of silica fume and rice-husk ash.

In yet another preferred embodiment, the amounts of OPC, calcium sulfate hemihydrate, amorphous silica, amorphous alumina, and filler are selected such that said mixture has a compressive strength of at least about 300 PSI after 10–60 minutes and an ultimate compressive strength that compares favorably with that of OPC and reaches at least 4,500 PSI after 28 days. Depending on the formulation of the cementitious binder and on the filler type and content, the ultimate compressive strength after 28 days can easily reach at least 7,000 PSI, and as much as 12,000 to 18,000 PSI.

As used herein, Ordinary Portland Cement (OPC) refers to Portland cement Types I, II, III, IV and white cement.

Calcined gypsum, as used herein, refers to calcium sulfate hemihydrate ($CaSO_4 \cdot \frac{1}{2}H_2O$), including the alpha and beta structures.

As used herein, a pozzolan or pozzolanic material is defined as a finely-divided siliceous material that reacts chemically with slaked lime at ordinary temperature and in the presence of moisture to form a strong slow-hardening cement. The lime may be generated in the cement mixture containing OPC.

The pozzolans as used herein should have a pozzolanic reactivity with calcium hydroxide of at least 700 mg of calcium hydroxide per gram. Typically, the reactivity of pozzolanic materials utilized in the present invention ranges from 700–1100 mg of calcium hydroxide per gram.

The amorphous alumina component, as used herein, should have a pozzolanic reactivity with calcium hydroxide of at least 600 mg of calcium hydroxide per gram.

As used herein, the term "stucco" refers to calcium beta hemi-hydrate. The use of alpha hemi-hydrate is known to be advantageous in many respects, however, the alpha hemi-hydrate is significantly more expensive. The term calcium hemi-hydrate, as used herein, includes all morphologies of calcium hemi-hydrate, including the alpha form.

BRIEF DESCRIPTION OF THE DRAWINGS

The invention is herein described, by way of example only, with reference to the accompanying drawings, wherein:

FIG. 1 is a graph of compressive strength developed over time for the cement composition of the present invention as compared with compositions according to the prior art;

FIG. 7 is a graph of 28-day dry compressive strength of cementitious mixtures as a function of weight ratio of calcined gypsum to OPC (and with a constant ratio of metakaolin to OPC), in which the narrow range of optimal, high-compressive strength mixtures of the present invention is demonstrated.

DESCRIPTION OF THE PREFERRED EMBODIMENTS

Figure 2:
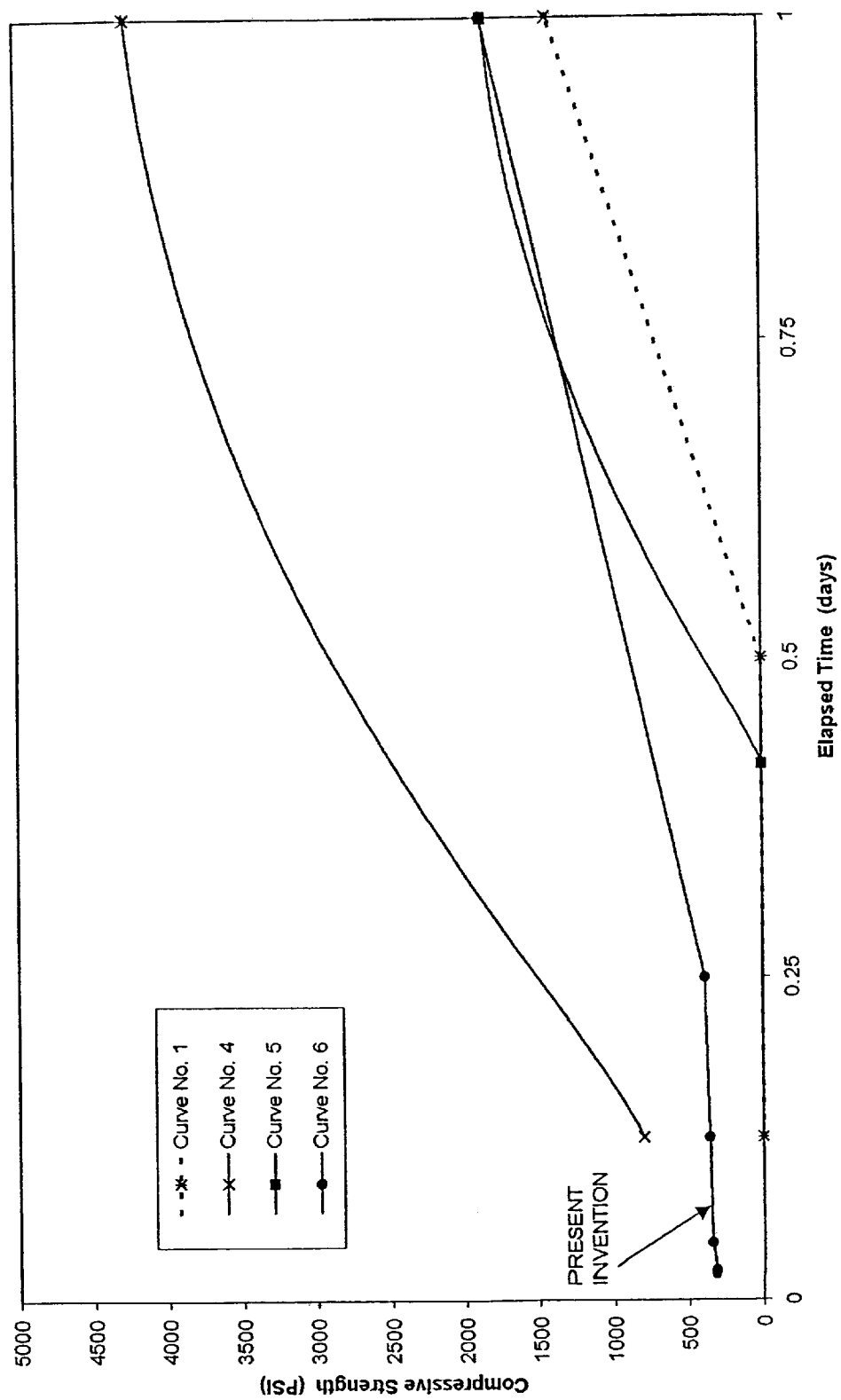
FIG. 2 is a graph of the early compressive strength developed over time for a cement composition according to the present invention as compared with the prior art Portland cement-containing compositions of FIG. 1.

The present invention provides a cementitious composition containing OPC, calcined gypsum, a source of amorphous silica and a source of amorphous alumina, wherein the ratio of calcium sulfate hemihydrate to OPC is 0.7:1.0 to 1.4:1.0, the ratio of amorphous silica and amorphous alumina to OPC is 0.26:1.0 to 0.4:1.0, and the ratio of amorphous alumina to amorphous silica is 0.3:1.0 to 1.5:1.0. The cementitious composition, by itself or mixed with aggregates such as sand, is fast-setting, exhibiting good early compressive strength within the first hour; good medium-term strength, that is, within 7–28 days, and very high late compressive strength; that is, compressive strength after at least 28 days and typically 3 months or more of curing.

Preferably, the ratio of calcium sulfate hemihydrate to OPC is 0.75:1.0 to 1.1:1.0, the ratio of amorphous silica and amorphous alumina to OPC is 0.3:1.0 to 0.35:1.0, and the ratio of amorphous alumina to amorphous silica is 0.6:1.0 to 1.2:1.0.

Despite the high content of calcium sulfate relative to most other OPC formulations, the cementitious composition is essentially waterproof, and exhibits excellent strength characteristics. Even under exposure to water for at least ½ year to 2 years, the cementitious material shows no sign of splitting, cracking or crumbling. Even samples immersed in hot water (45° C.) for up to ½ year exhibit no signs of deterioration. The use of calcined gypsum in place of alumina cement or even OPC is of great economic advantage, and in addition, provides the cementitious composition with quick-setting characteristics.

It has been discovered that the combination of desirable properties in the cementitious mixtures of the present invention is attainable only over a relatively narrow range of compositions. A cementitious mixture of OPC, calcined gypsum, amorphous silica and amorphous alumina (total=100%) must contain at least about 30–35% calcined gypsum for the mixture to be fast-setting. For the cementitious mixture to be substantially waterproof, the mixture must contain less than about 50–55% calcined gypsum. It has been assumed in the above-mentioned ratios that enough amorphous silica and amorphous alumina have been added to neutralize the lime from OPC. It is known in the art that effective neutralization of lime is achieved in cementitious mixtures containing pozzolan and OPC in a weight ratio of at least about 0.3:1 for pozzolanic materials with typical reactivity.

In a preferred embodiment, the cementitious material further comprises 0–95% by weight of filler selected from a group consisting of pozzolanic aggregate (such as pumice, perlite, fly-ash, etc.), non-pozzolan aggregate (such as calcium carbonate, quartz), and fibers.

In another preferred embodiment, the source of amorphous silica in the cementitious material is selected from the group consisting of silica fume, rice-husk ash or metakaolin. U.S. Pat. No. 5,858,083 to Stav et al. teaches that while the amorphous silica component is an extremely active pozzolan and prevents the formation of ettringite, the amorphous silica component must include no more than 0.6 wt. % alumina to be effective. Since typical oxide analyses of silicon fumes made from the ferrosilicon alloy industry contain 1.0%–2.5% $Al_2O_3$, and North American blast-furnace slags have $SiO_2$ amounts of as low as 33% and $Al_2O_3$ amounts as high as 10.8%, U.S. Pat. No. 5,858,083 concludes that not all pozzolans, and specifically, not all silica fumes, are acceptable for use according to the invention. Metakaolin is particularly unacceptable because of the high alumina content.

Although the prior art teaches the desirability of inhibiting ettringite formation, compositions according to the present invention are designed to promote the early formation of ettringite, which provides strength to the cementitious mixture. In sharp contrast to the teachings of the prior art, it has been discovered that with binders containing amorphous alumina along with amorphous silica, the ultimate compressive strength of the cementitious mixture is improved appreciably relative to cementitious mixtures with binders containing amorphous silica with little or no amorphous alumina. Thus, pozzolanic materials with high levels of amorphous alumina, such as metakaolin, are particularly appropriate for formulating these novel cementitious mixtures.

It must be emphasized that the microstructure of cementitious mixtures according to the present invention is different from the microstructure of cementitious mixtures according to the prior art: in OPC mixtures with a high sulfate content and containing amorphous silica (U.S. Pat. Nos. 4,494,990, 5,858,083), the pozzolanic reaction with calcium hydroxide produces hydrated calcium silicate, which essentially coats the abundant, crystalline gypsum phase in the cementitious mixture sulfate. By contrast, the microstructure of the novel cementitious mixture is largely homogeneous and amorphous, with a greatly-reduced presence of crystalline sulfate phases (gypsum and ettringite). This feature is described in further detail below. Without wishing to be limited by the theoretical explanations above, it is believed that such differences in the microstructure account for much of the improvement in physical characteristics over prior art cementitious mixtures.

In another preferred embodiment, the cementitious binder of the present invention comprises: about 30–55% by weight OPC, about 35–52% by weight calcium sulfate hemihydrate, about 5–12% by weight amorphous silica, and about 3–9% by weight amorphous alumina.

In yet another preferred embodiment, the amounts of OPC, calcium sulfate hemihydrate, amorphous silica, amorphous alumina, and filler are selected such that the mixture has a compressive strength of at least about 300 PSI after 10–60 minutes and an ultimate compressive strength that compares favorably with that of OPC and reaches as much as about 18,000 PSI after 28 days.

The physical characteristics of the cementitious material, including the compressive strength developed over time, may be better understood with reference to the drawings and the accompanying description.

Figure 1:
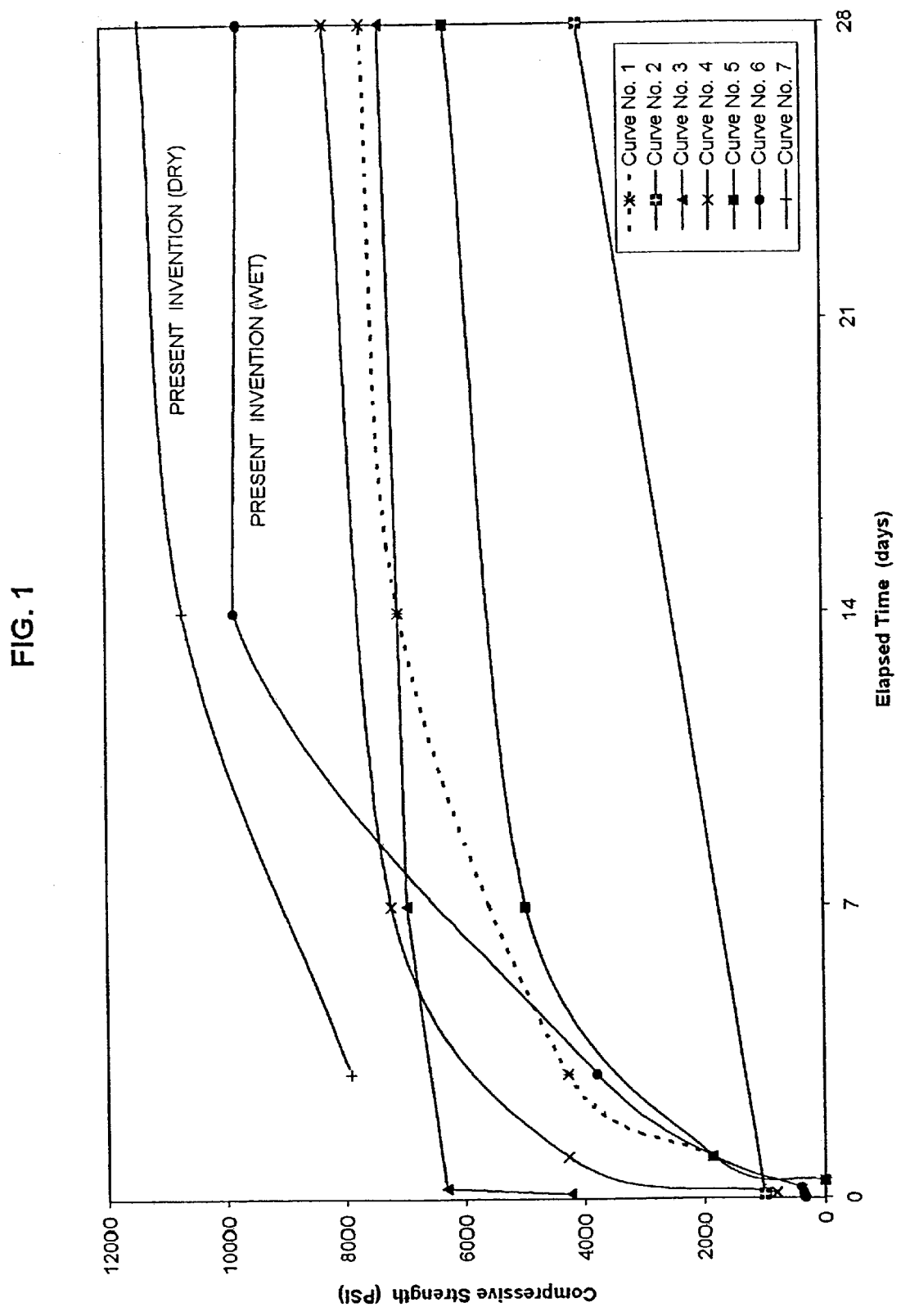

Referring now to the drawings. FIG. 1 is a graph of the compressive strength developed over time for the cement composition of the present invention as compared with compositions as disclosed in the prior art.

Curve No. 1 shows typical compressive strength development for ordinary Portland cement mixed with sand as filler;

Curve No. 2 shows typical compressive strength development for a binder containing ordinary Portland cement, calcium aluminate and calcium sulfate mixed with sand as a filler, according to U.S. Pat. No. 3,997,353;

Curve No. 3 shows typical compressive strength development for a binder containing ordinary Portland cement, calcium aluminate and calcium sulfate mixed with sand as a filler, according to U.S. Pat. No. 4,350,533;

Curve No. 4 shows typical compressive strength development for a binder containing ordinary Portland cement, calcium sulfate (alpha hemihydrate), and a pozzolanic material mixed with sand as a filler, according to U.S. Pat. No. 4,494,990;

Curve No. 5 shows typical compressive strength development for a binder containing clinker, calcined clay and calcium sulfate mixed with sand as a filler, according to U.S. Pat. No. 5,788,762;

As compared with the above-mentioned prior art cementitious mixtures, Curve No. 6 shows typical compressive strength development for a binder containing ordinary Portland cement, calcium sulfate (beta hemihydrate), and metakaolin mixed with sand as a filler, according to the present invention;

Curve No. 7 shows typical dry compressive strength development for a binder containing ordinary Portland cement, calcium sulfate (beta) hemihydrate, and metakaolin mixed with sand as a filler, according to the present invention.

The cementitious mixtures containing calcium aluminate cement (Curve Nos. 2, 3) display excellent early compressive strength. The ultimate compressive strength may be higher (Curve No. 3) or lower (Curve No. 2) than the ultimate compressive strength of a typical cementitious mixture in which the binder consists solely of OPC (Curve No. 1).

As mentioned above, calcium aluminate cements are expensive relative to OPC, and the maximum content of calcium sulfate is limited to about 20–30% to prevent excess expansion leading to deterioration of the cement over the long term.

The cementitious mixture in which the binder contains ordinary Portland cement, alpha calcium sulfate hemihydrate and a pozzolan displays excellent ultimate strength (Curve No. 4) relative to OPC (Curve No. 1). The early strength is also good (see also FIG. 2), due to the hydration of alpha calcium sulfate hemihydrate to calcium sulfate dihydrate (gypsum). However, this composition is formulated to substantially inhibit the reaction of gypsum with tricalcium aluminate in the OPC, such that ettringite is not formed. While blocking the formation of ettringite may contribute to the long-term durability of the cementitious mixture, the significant potential strength associated with ettringite formation is not utilized. It should also be noted that compressive strength results are obtained using alpha-hemihydrate. The alpha-hemihydrate reduces the requisite water/hemihydrate ratio as compared to the beta-hemihydrate, resulting in a cementitious mixture of higher density and with improved compressive strength. However, the alpha hemihydrate is substantially more expensive than the beta hemihydrate.

The compressive strength development for a binder containing clinker, calcined clay and calcium sulfate mixed with sand is shown in Curve No. 5.

In contrast to the above-mentioned cementitious mixtures, the cementitious mixture according to the present invention displays unique compressive strength development. As is clearly evident from Curve No. 6, the mixture is fast-setting, with a compressive strength of 400 PSI within the first 3 hours (see also FIG. 2). The compressive strength increases to about 10,000 PSI within 7 days.

The dry compressive strength development is shown in Curve No. 7. The compressive strength reaches about 8.000 PSI after only 3 days, and after 28 days, a compressive strength of over 11,000 PSI is attained.

As can be seen with better clarity in FIG. 2, Ordinary Portland Cement (such as Type III) mixed with sand as a filler (Curve No. 1) takes 12–24 hours to develop initial compressive strength. The behavior of the cementitious mixture with a binder containing clinker, calcined clay and calcium sulfate (Curve No. 5) is qualitatively similar.

Figure 3:
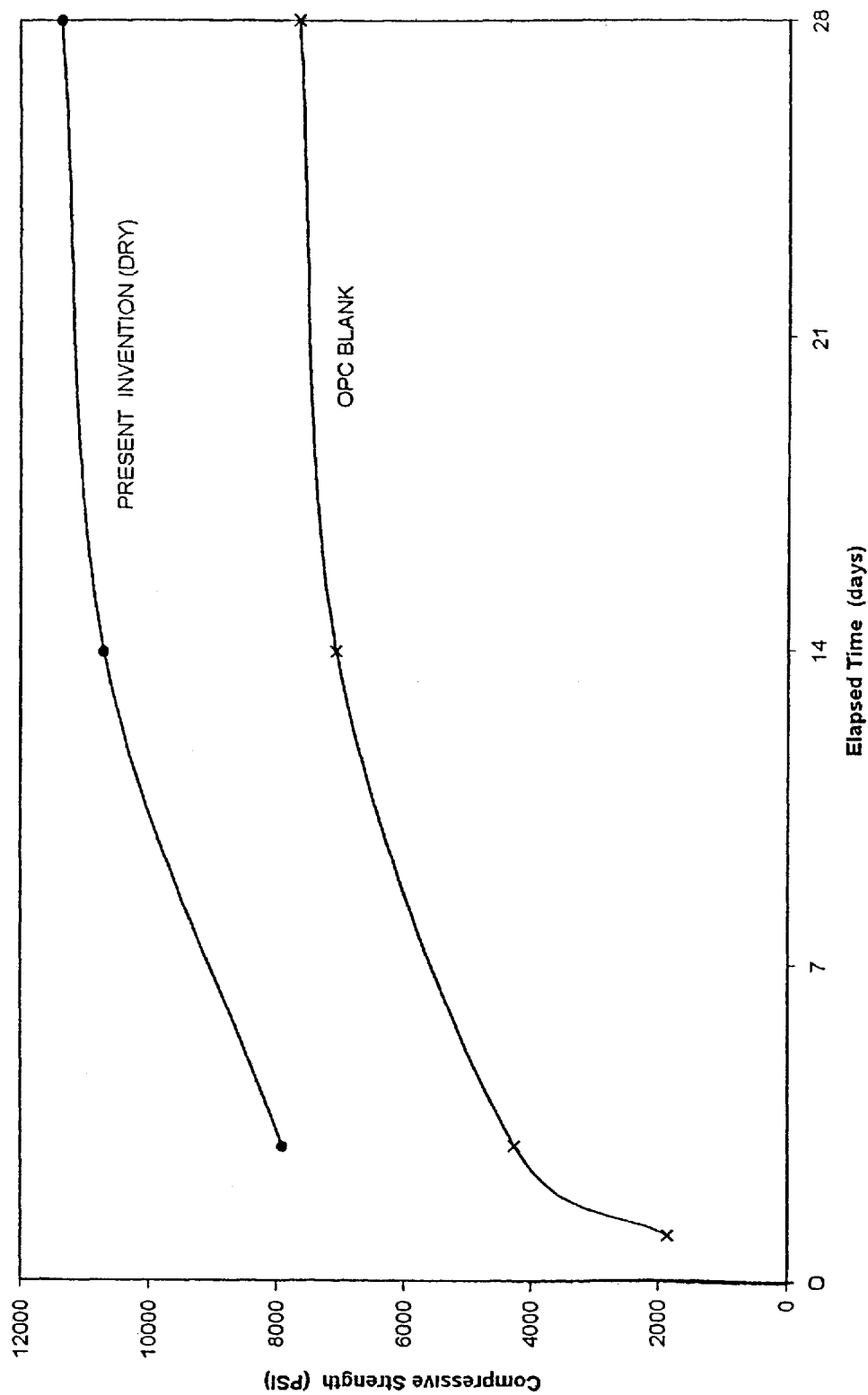
FIG. 3 exhibits the compressive strength developed over 1–28 days for a cementitious mixture according to the present invention as compared with the compressive strength of a reference mixture containing solely OPC as binder and ordinary sand as filler.

In FIG. 3, the compressive strength developed over 1–28 days for a cementitious mixture according to the present invention is compared with the compressive strength of a reference mixture containing solely OPC as binder and ordinary sand as filler. The exact compositions are provided in Table 5. While the overall shape of the curves is similar, the compressive strength exhibited over both the medium-term and the long-term is substantially higher for the inventive mixture.

Figure 4A:
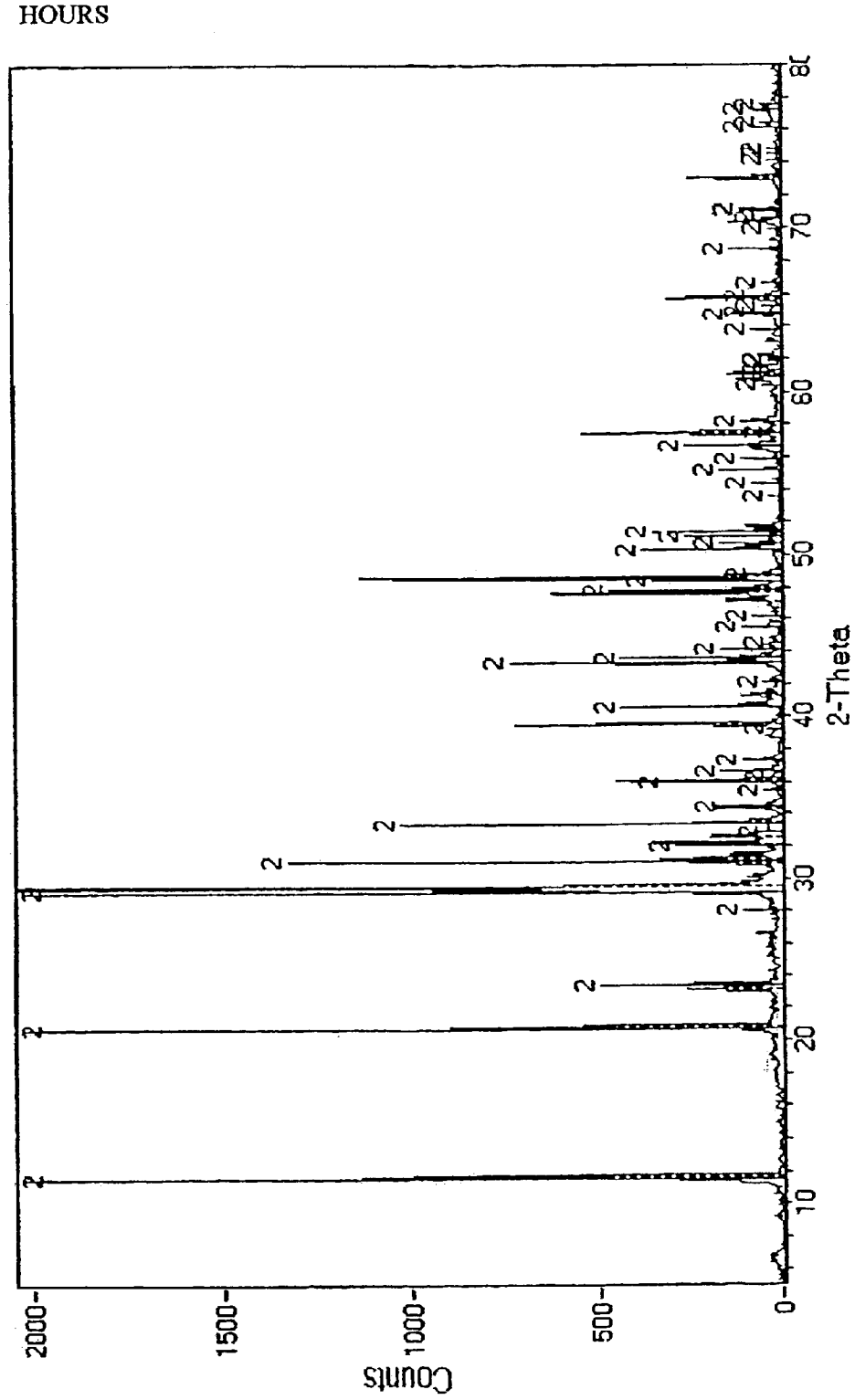
FIGS. 4a–4d are X-ray diffraction (XRD) scans of a cementitious mixture according to the present invention, in which the scans show the development of the crystalline structures within the cement over time (6 hours–6 months)

Several theoretical mechanisms may be proposed for the strength development of the cementitious mixture according to the present invention, particularly in regard to the formation of dense, microcrystalline ettringite and the non-expansive long-term behavior of the cement. Without wishing to be limited by these explanations, it is believed that the strength of the cementitious material according to the present invention is established by several reactions taking place over time, some in parallel, some in series. The conversion of the calcium sulfate hemihydrate to gypsum by the hydration reaction takes place within minutes, providing a compressive strength of at least about 360 PSI after only 6 hours. At this stage only $CaSO_4.2H_2O$ is detected by XRD (FIG. 4a).

Figure 4B:
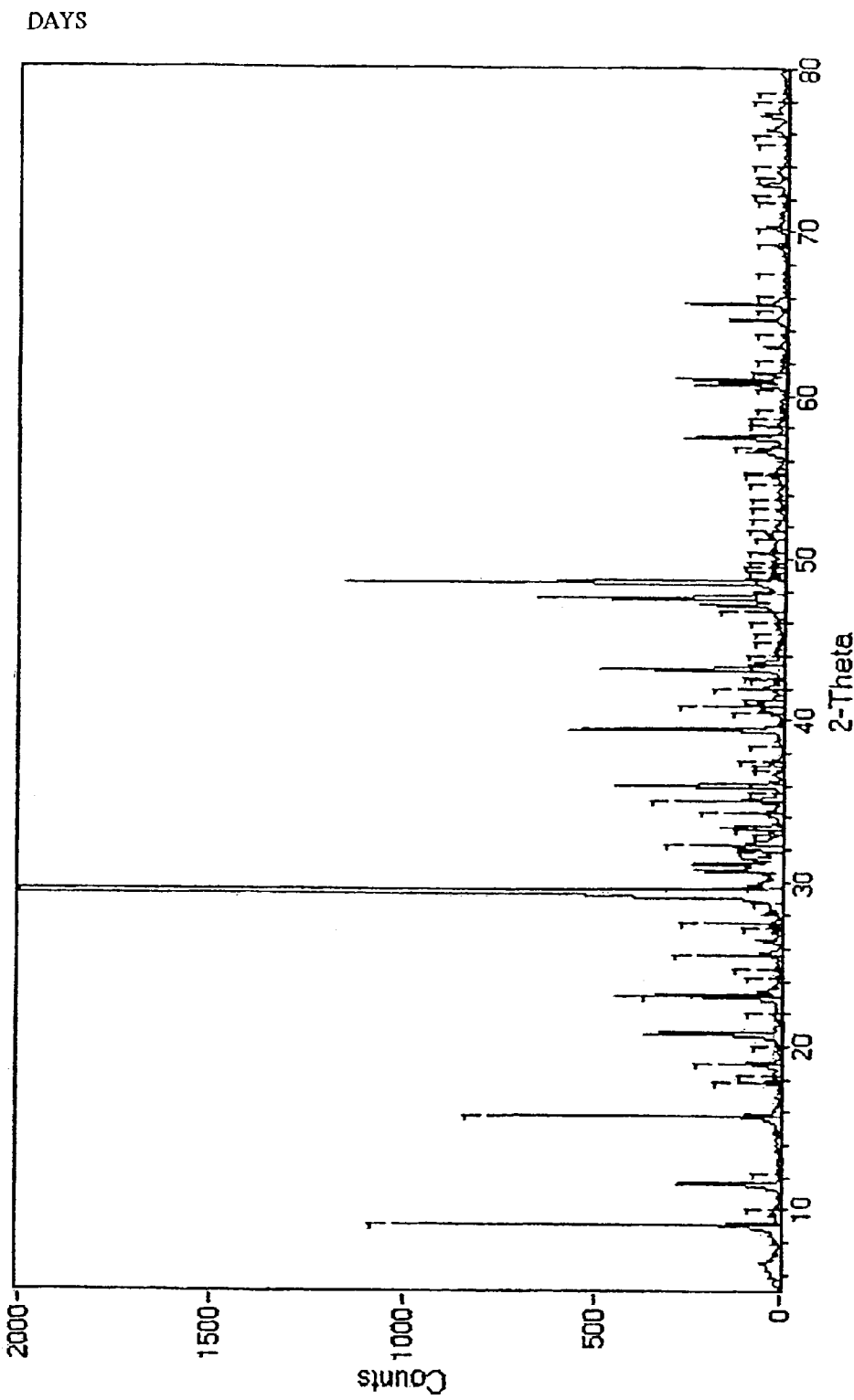

FIG. 4b is an XRD scan of the novel cement mixture after 6 days. A large ettringite peak has formed, even though the presence of $Ca(OH)_2$ is not detected. The total peak intensity decreases from 6033 to 4456, which appears to be due to the formation of CSH gel and the amorphization of the system. These phenomena indicate that there are several reactions taking place in parallel: CSH formation, pozzolanic reaction and ettringite formation.

Figure 4C:
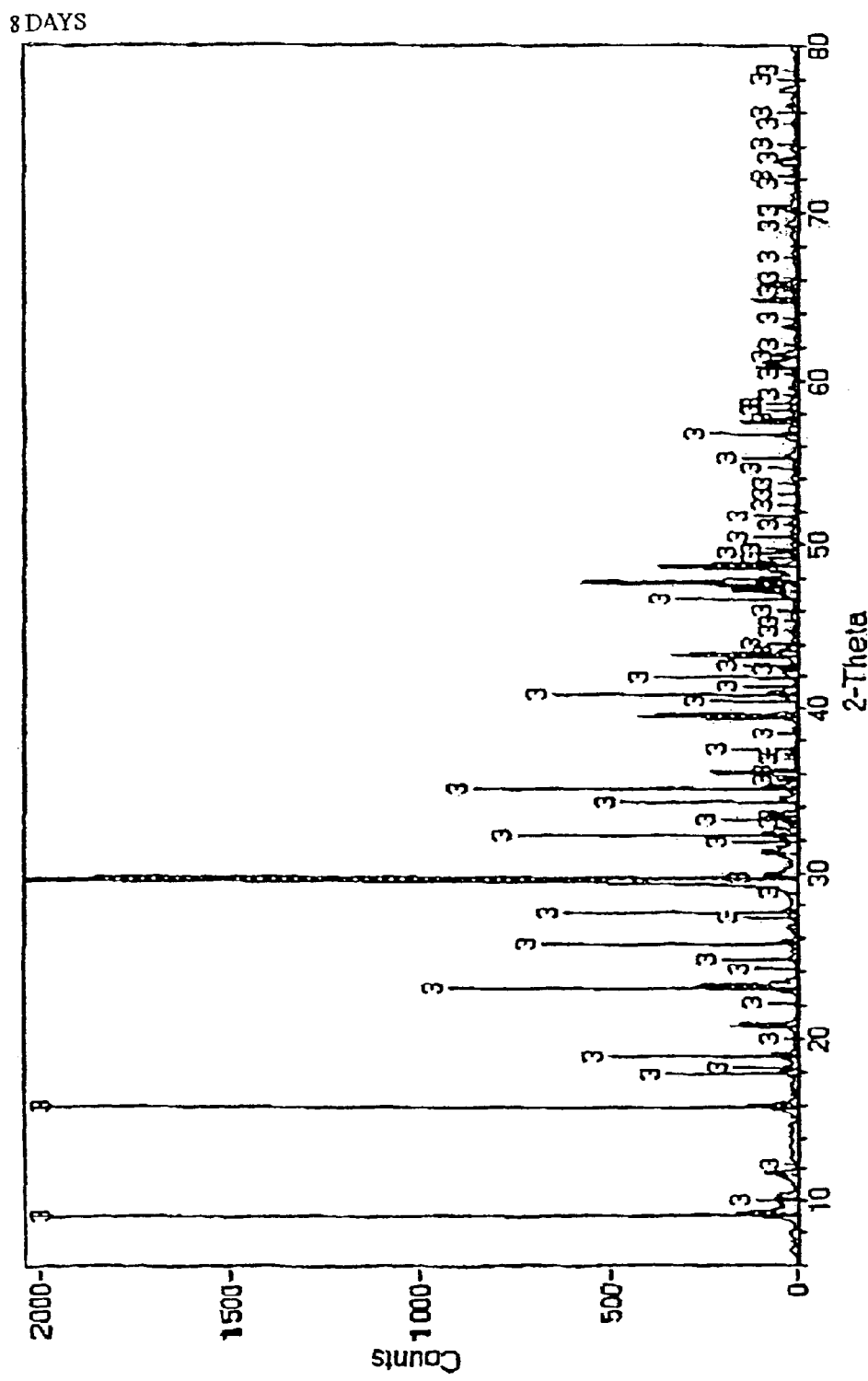

The total intensity decreases further to 2985 after 28 days (FIG. 4c), and the $CaSO_4.2H_2O$ and ettringite peaks are substantially reduced. As in the previous XRD scan, no $Ca(OH)_2$ was detected. It appears that, while the formation of CSH continues over time, the presence of ettringite and gypsum is reduced. Since no ettringite is formed, no ettringite-related expansion occurs, and the cementitious system exhibits excellent stability.

Figure 4D:
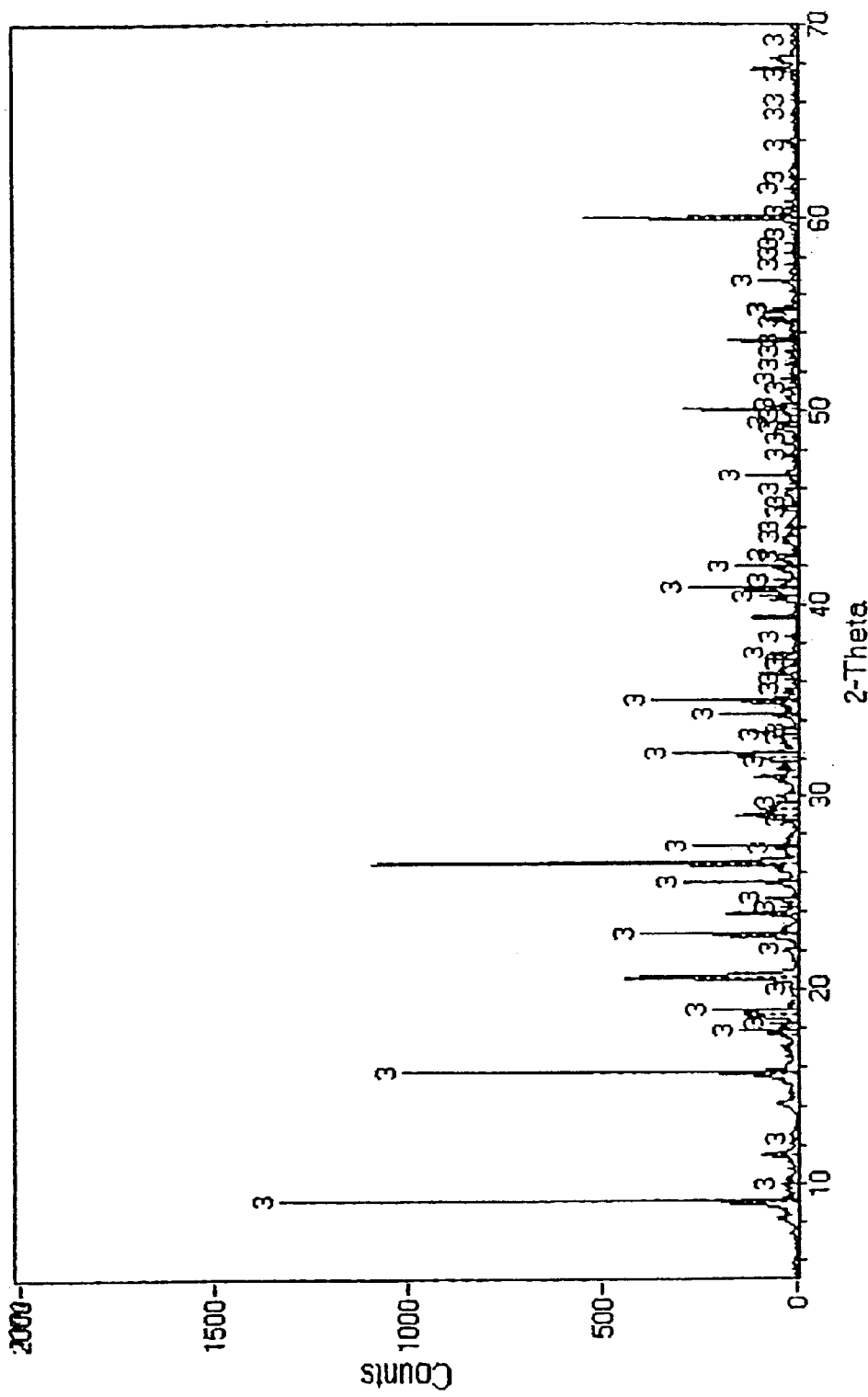

After six months in water (FIG. 4d), the total peak intensity is further reduced to 1084. As in the previous XRD scan, no $Ca(OH)_2$ was detected, and the ettringite and gypsum peaks remain small.

Crystalline sources of alumina in cement clinker, such as tricalcium aluminate, are hydrated in the presence of water to form hexagonal plate crystals consisting essentially of $4CaO \cdot Al_2O_3 \cdot 19H_2O$ and $2CaO \cdot Al_2O_3 \cdot 8H_2O$. These hydrates are metastable and are transformed over time into a less soluble and more stable crystalline hydrate of the composition $3CaO \cdot Al_2O_3 \cdot 6H_2O$, which has a cubic structure. The morphological evolution of the crystalline alumina, coupled with the formation of ettringite in the presence of sulfate, cause expansive pressures within the cementitious mixture that, over the long term, lead to swelling, cracking, and crumbling of the cement. Moreover, the process in which $4CaO \cdot Al_2O_3 \cdot 19H_2O$ is converted to $3CaO \cdot Al_2O_3 \cdot 6H_2O$ releases water, which then participates in various additional reactions within the cementitious mixture, including the formation of ettringite. Hence, it is believed that further chemical and physical deterioration of the cement is caused indirectly by the morphological evolution of crystalline alumina.

The use of amorphous alumina eliminates the problems associated with the morphological evolution of crystalline alumina. In addition, for reasons which are not yet fully understood, amorphous alumina in the cementitious mixture reduces the amount of crystalline sulfate—gypsum and ettringite—in the cementitious mixture over the long term. As a result, the cement structure is more amorphous, homogeneous, and densely-packed, and is essentially free of the expansive pressures that typically develop in the known cementitious mixtures of the prior art.

The stability of the cementitious system according to the present invention was verified in a dimensional stability test conducted according to Israeli Standard No. 896. The sample contracted by 0.07% after 30 days in water, and no expansion was detected, indicating that the ettringite in this system is stable and does not continue to form and expand as in other high-sulfate, high-alumina systems.

Figure 5A:
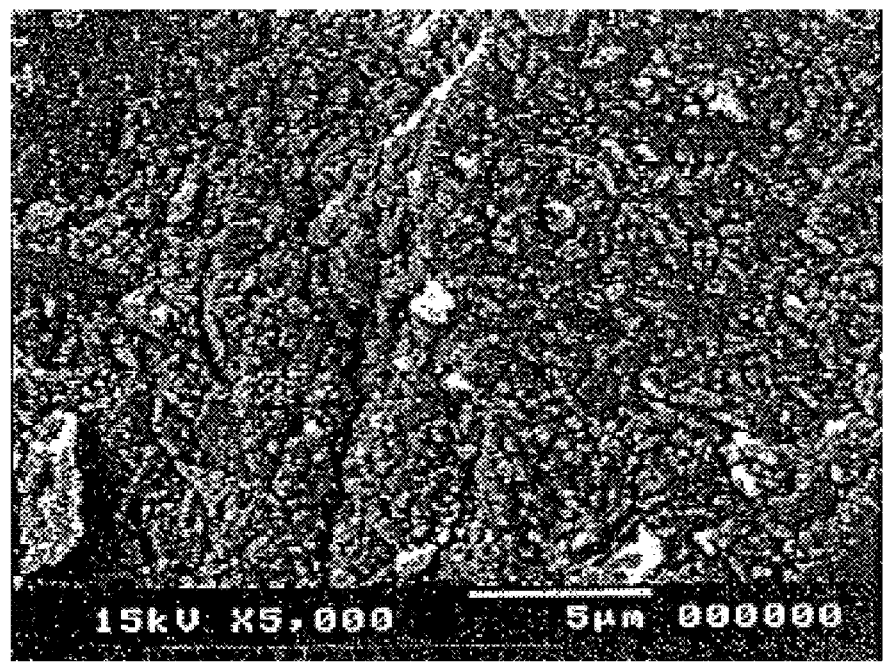
FIGS. 5a–5b are SEM (scanning electron microscope) micrographs depicting the microstructure of the cement matrix of the inventive cement binder.
Figure 5B:
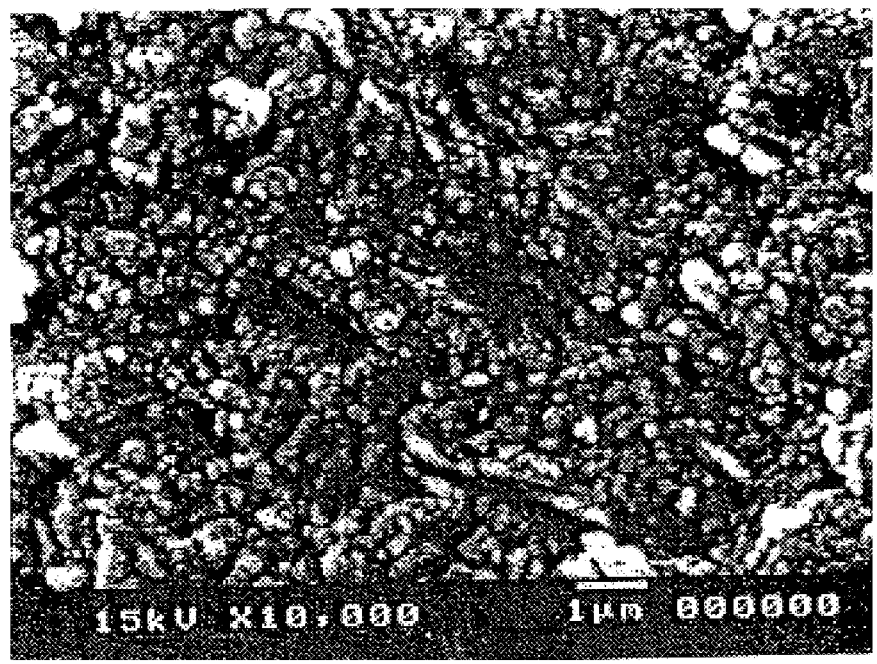
Figure 6A:
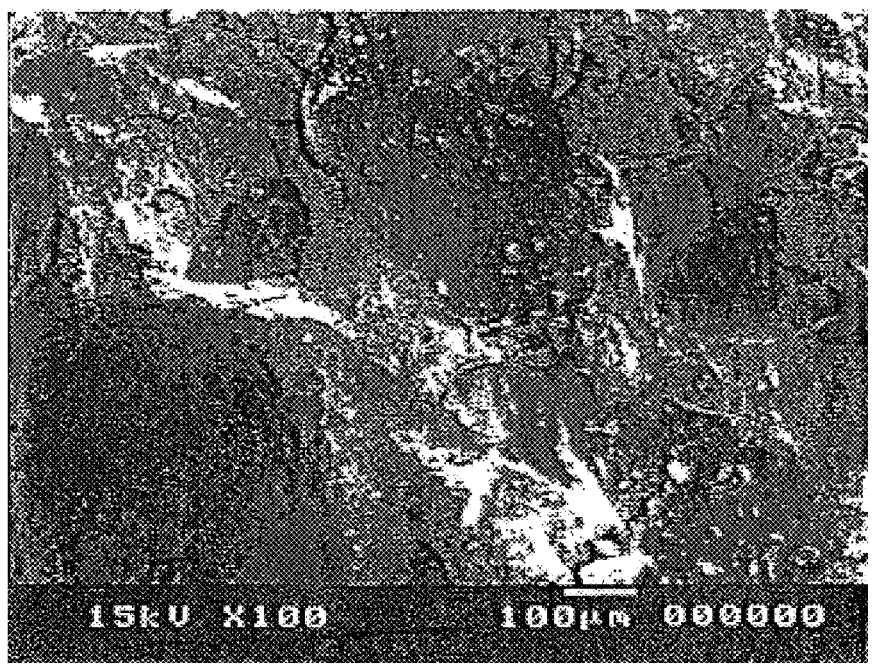
FIGS. 6a–6e are SEM micrographs depicting the microstructure of the cement matrix, aggregate particles, and the matrix-aggregate interface of a cementitious mixture according to the present invention.
Figure 6B:
Figure 6C:
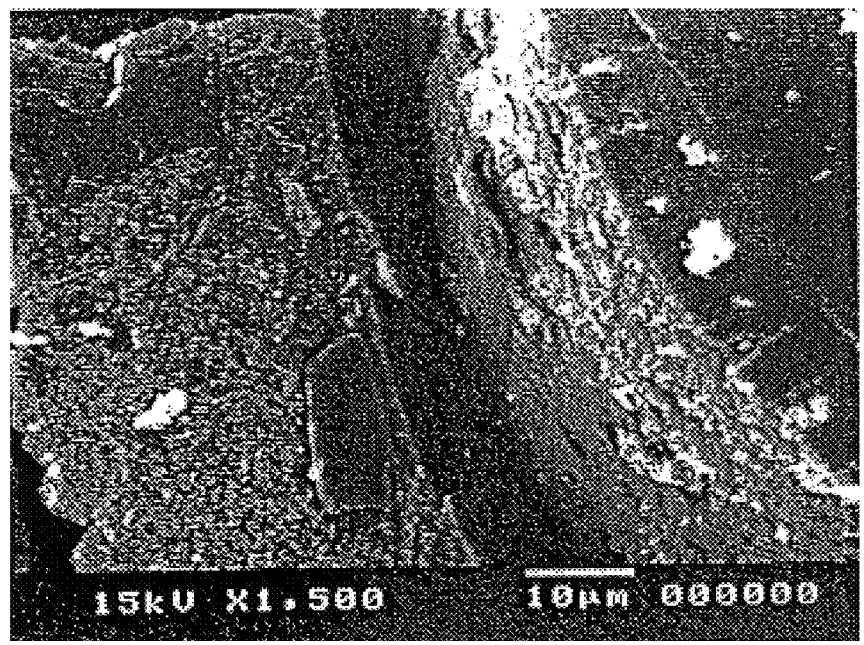
Figure 6D:
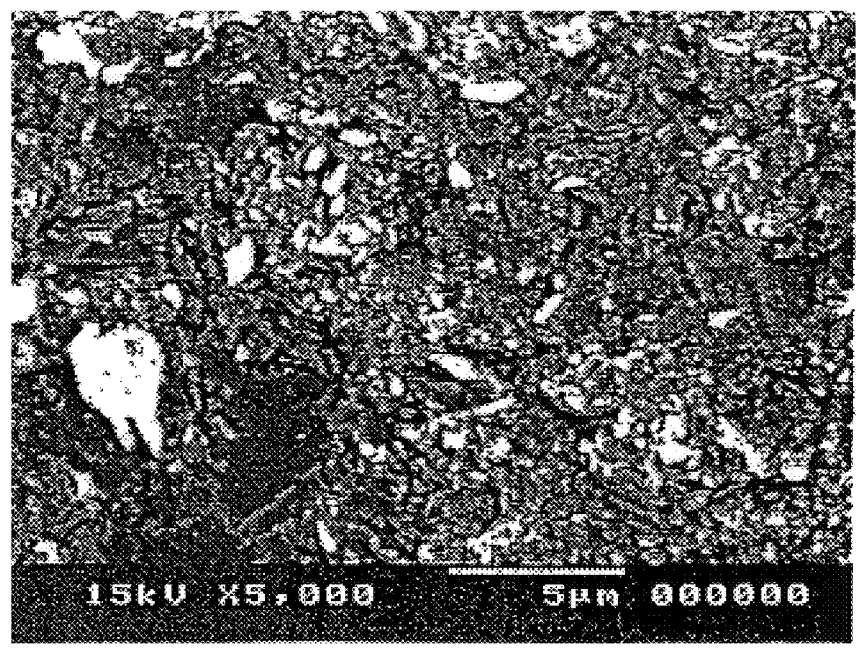
Figure 6E:
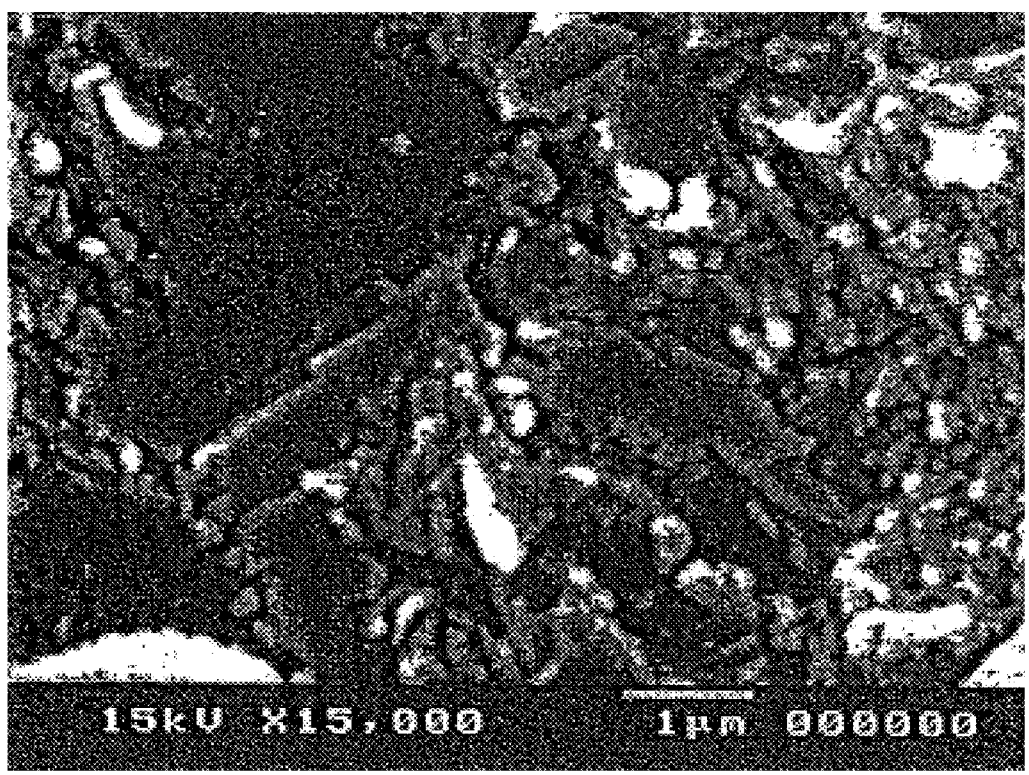

SEM micrographs of the cement structure support the findings from the XRD scans. In magnifications of up to ×10,000 (FIGS. 5a and 5b), the structure of the cement binder is highly homogeneous, with no evidence of gypsum or ettringite crystals.

FIGS. 6a–6e are SEM micrographs for a cementitious mixture containing aggregate particles. The interface of the cement matrix and aggregate particle is clearly seen in FIGS. 6b–6c. Whereas in high-alumina, high-sulfate cementitious mixtures according to the prior art, ettringite crystals typically abound, or are expected to abound, in the interface region, in the cementitious mixture according to the present invention, no ettringite crystals are observed in the interface of the cement matrix and aggregate particle.

In magnifications of up to ×15,000 (FIGS. 6d, 6e), the structure of the cement binder is highly homogeneous and appears to be amorphous; no gypsum or ettringite crystals are discernable.

The XRD data is supported and complemented by the SEM micrographs. Together, they provide a firm theoretical basis for the excellent measured characteristics of long-term dimensional stability and compressive strength for the cementitious system according to the present invention.

The amount of pozzolanic material in cementitious mixtures of the present invention must be sufficient to neutralize the calcium hydroxide and other basic compounds that evolve during the hydration of the cement. For extra-fine metakaolin of normal reactivity, a ratio of approximately 0.3 weight units of metakaolin per weight unit of OPC is required. A slight stoichiometric excess of the pozzolanic material is desirable.

The influence of the pozzolan to OPC ratio on compressive strength is clearly evident in Table 1. The samples were cured in plastic bags for 28 days and subsequently dried. Composition 1, which has an appropriate ratio of metakaolin to OPC (0.30:1.0), displays excellent compressive strength (33 MPa). Compositions 2–4, which possess less-than stoichiometric ratios of metakaolin to OPC (0.05:1.0 to 0.15:1.0), disintegrated upon testing.

U.S. Pat. No. 5,958,131 to Asbridge et al. teaches a composition suitable for adding to water to produce a water-resistant hydraulic solid which comprises calcium sulfate hemihydrate, portland cement and calcined clay having a pozzolanic activity, wherein the percentages by weight of the components range from 20–98% calcium sulfate hemihydrate, 1–50% portland cement, and 1–30% of said calcined clay. The proportion of calcium sulfate hemihydrate is preferably in the range of from 47.5% to 91% by weight; the proportion of portland cement is preferably in the range of from 7% to 40% by weight; the proportion of calcined clay is preferably in the range of from 2% to 12.5% by weight. The desired ratio of hemihydrate to OPC is in the range of 2:1 to 10:1; the preferred ratio of OPC to calcined clay is in the range of 2:1 to 10:1.

TABLE 1

| 4 | 3 | 2 | 1 | Composition No.: |
|---|---|---|---|---|
| Composition (Weight Percent) | | | | Component |
| 51.7 | 49.4 | 47.1 | 40 | Stucco |
| 46 | 46 | 46 | 46 | OPC |
| 2.3 | 4.6 | 6.9 | 14 | Metakaolin |
| 0.05 | 0.10 | 0.15 | 0.30 | Metakaolin/OPC |
| disintegrated | disintegrated | disintegrated | 33 | Compressive Strength (MPa) |

It should be noted that Composition Nos. 2–4, which disintegrated upon testing, are within the range of water-resistant compositions taught by U.S. Pat. No. 5,958,131. Moreover, Composition Nos. 2 and 3 fall within the preferred range of weight ratios.

Table 2 provides the compositions of samples with calcined-gypsum (stucco) to OPC ratios of 1.6:1.0 to 3.9:1.0. The Metakaolin/OPC ratio was kept constant at 0.30:1.0. Table 3 provides the compressive strength for samples of composition numbers 5–8 during the first 24 hours of curing. The wet cement cubes were cured in a plastic bag at room temperature. The early compressive strengths of the samples are fairly similar, with those samples containing higher levels of calcined gypsum attaining slightly higher strengths.

TABLE 2

| Composition No. | | | | |
|---|---|---|---|---|
| 8 | 7 | 6 | 5 | Component |
| (Weight Percent) | | | | |
| 75 | 70 | 65 | 55 | Stucco |
| 19.2 | 23 | 27 | 34.6 | OPC |
| 5.7 | 6.9 | 8 | 10.3 | Metakaolin |
| 100 | 100 | 100 | 100 | Total |
| Weight Ratio | | | | |
| 3.9 | 3.0 | 2.4 | 1.6 | Stucco/OPC |
| 0.30 | 0.30 | 0.30 | 0.30 | Metakaolin/OPC |

TABLE 3

| Composition No. | | | | |
|---|---|---|---|---|
| 8 | 7 | 6 | 5 | Curing Time |
| Compressive Strength (MPa) | | | | |
| 2.6 | 2.0 | 2.2 | 2.2 | 30 minutes |
| 2.2 | 2.0 | 2.1 | 2.2 | 3 hours |
| 4.0 | 3.0 | 2.0 | 3 | 24 hours |

FIG. 7 (based on data provided in Table 4) is a graph of 28-day dry compressive strength of cementitious mixtures as a function of weight ratio of calcined gypsum to OPC and with a fixed weight-ratio of metakaolin to OPC of 0.3:1.0. The compressive strength of the cementitious mixtures increases sharply and monotonically until a maximum is attained at a calcined gypsum to OPC ratio of about 0.8:1.0 to about 1.0:1.0. As the ratio of calcined gypsum to OPC is further increased, the compressive strength of the cementitious mixtures decreases rapidly.

At ratios of calcined gypsum to OPC below 0.5:1, the compressive strength of the cementitious mixtures is particularly poor, and, similarly, at ratios of calcined gypsum to OPC above 2:1, the compressive strength of the cementitious mixtures is also particularly poor. It must be emphasized that the preferred range of U.S. Pat. No. 5,958,131 to Asbridge et al. is between 2:1 and 10:1. By sharp contrast, it has been discovered in the instant invention that there exists a narrow range of optimal, high-compressive strength mixtures containing a weight ratio of calcined gypsum to OPC of between about 0.7:1 to about 1.4:1, and more preferably, of between about 0.75:1 to about 1.1:1.

Moreover, in U.S. Pat. No. 5,958,131, water-resistance is indicated by comparing the wet compressive strength of metakaolin-containing cementitious mixtures with the wet compressive strength of cementitious mixtures of similar compositions, but not containing metakaolin. A more correct evaluation method of water resistance, however, is to compare the wet compressive strength of metakaolin-containing cementitious mixtures with the dry compressive strength of the same metakaolin-containing cementitious mixtures.

To this end, cement cubes (25 mm×25 mm×25 mm) having different binder compositions were prepared. In all cases, the cementitious mixture contained 25% binder and 75% filler. The cubes were removed from the molds after a setting time of 15 minutes. Two different curing procedures were performed:

1) curing in an oven at 45° C. for 18 days;
2) curing in a plastic bag for 28 days.

The specific gravity and compressive strength of cubes of various compositions were determined immediately after removing the cubes from the oven after curing for 18 days at 45° C. The results (Table 5) qualitatively support the findings of Table 4 regarding the compressive strength of the cementitious mixtures. At calcined gypsum to OPC ratios above 1.5:1, the compressive strength of the cementitious mixtures decreases rapidly.

TABLE 4

| Compressive Strength | Stucco/OPC | (Weight Percent) | | Composition |
|---|---|---|---|---|
| (MPa) | (Weight Ratio) | OPC | Calcined Gypsum | No. |
| 9.3 | 3.91 | 19.2 | 75 | 8 |
| 12.3 | 3.04 | 23 | 70 | 7 |
| 15.5 | 2.41 | 27 | 65 | 6 |
| 23.3 | 1.59 | 34.6 | 55 | 5 |
| 33.4 | 0.87 | 46 | 40 | 9 |
| 18 | 0.56 | 54 | 30 | 10 |
| 0 | 0.33 | 61.3 | 20 | 11 |

TABLE 5

| Composition No. | | | | |
|---|---|---|---|---|
| 8 | 7 | 6 | 5 | |
| 3.9 | 3. | 2.4 | 1.6 | Stucco/OPC Weight Ratio |
| 2 | 1.98 | 2.0 | 2.03 | Moist Specific Gravity (g/cm$^3$) |
| 7.8 | 9.4 | 12.8 | 16.0 | Moist Compressive. Strength (MPa) |

After drying to constant weight in an oven for four days, the specific gravity and dry compressive strength of cubes of the various compositions were determined (Table 6). A moderate drop in dry compressive strength with increasing calcined gypsum to OPC ratios (above 1.5:1) is observed.

TABLE 6

| Composition No. | | | | |
|---|---|---|---|---|
| 8 | 7 | 6 | 5 | |
| 1.68 | 1.69 | 1.70 | 1.70 | Dry Specific Gravity (g/cm$^3$) |
| 17.3 | 19.2 | 20.1 | 22.7 | Dry Compressive. Strength (MPa) |

Upon examination of the compressive strength data provided in Tables 5 and 6, it is clearly evident that the wet compressive strength decreases more rapidly than the dry compressive strength for all four compositions having high calcined gypsum to OPC ratios. This, in essence, is the wet/dry compressive strength ratio (or moist/dry compressive strength ratio), the most realistic evaluation method of water resistance. As shown in Table 7, the moist/dry compressive strength ratio drops from 0.70 to 0.45:1 as the calcined gypsum to OPC ratio increases from about 1.6:1 to about 3.9:1.

TABLE 7

| Composition No. | | | | |
|---|---|---|---|---|
| 8 | 7 | 6 | 5 | |
| 3.9 | 3.0 | 2.4 | 1.6 | Stucco/OPC Weight Ratio |
| 0.45 | 0.48 | 0.64 | 0.70 | Moist/Dry Compressive. Strength Ratio |

Qualitatively-similar results are obtained for cementitious mixtures cured in a plastic bag for 28 days at room temperature (Table 8). Hence, in sharp contrast to the extremely low ratios of wet compressive strength to dry compressive strength obtained in cementitious mixtures in the preferred composition range of U.S. Pat. No. 5,958,131 to Asbridge et al. (~0.4:1.0) the ratio of wet compressive strength to dry compressive strength in cementitious mixtures of the present invention is above 0.6:1.0, and more typically, 0.8:1.0 to 0.9:1.0 and above.

Hence, in contrast to the teachings of U.S. Pat. No. 5,958,131, it has been discovered that a high weight-ratio of calcined gypsum to OPC yields a relatively low-strength cementitious mixture having insufficient water resistance.

TABLE 8

| 8 | 7 | 6 | 5 | |
|---|---|---|---|---|
| 1.69 | 1.71 | 1.7 | 1.75 | Dry Specific Gravity (g/cm$^3$) |
| 9.34 | 12.3 | 15.5 | 23.3 | Dry Compressive. Strength (MPa) |
| 3.8 | 4.6 | 5.9 | 11.6 | Wet Compressive. Strength (MPa) |
| 0.4 | 0.37 | 0.38 | 0.49 | Wet/Dry Compressive. Strength Ratio |
| 7 | 7 | 7 | 7 | pH after 40 days |

EXAMPLE 1

An exemplary composition according to the present invention is given in Table 9.

TABLE 9

| Composition # 9 | Weight % |
|---|---|
| White Portland Cement | 13.8 |
| Gypsum | 0.5 |
| Beta - Hemihydrate | 12 |
| Metakaolin | 4.2 |
| CaCO$_3$ <0.6 mm | 69 |
| Retardant-P | 0.02 |
| Melment F-10 | 0.5 |

The dry components were mixed thoroughly to obtain a homogeneous blend. The dry blend, weighing 600 grams, was mixed with 111 ml. of water for 3 minutes in a HOBART mixer. The cementitious mixture was poured into a 40×40×160 mm mold and was cured in a plastic bag for 28 days. The wet compressive strength of the cementitious mixture, over time, is presented in Table 10.

TABLE 10

Wet Compressive Strength of Composition #9

| | Compressive Strength (Mpa) |
|---|---|
| 10 Hours | 6.9 |
| 1 Day | 7.6 |
| 7 Days | 64 |
| 14 Days | 67 |
| 28 Days | 76 |
| 60 Days[1] | 91 |
| 6 months[2] | 94 |

[1]After 28 days of curing in a plastic bag, the sample was immersed in water for an additional 32 days.
[2]After 28 days of curing in a plastic bag, the sample was immersed in water for an additional 5 months.

EXAMPLE 2

An exemplary composition according to the present invention is given in Table 11. The composition of the binder is identical to that of Example 1; the calcium carbonate filler used in Example 1 was replaced with a fine silica sand. The dry components were mixed thoroughly to obtain a homogeneous blend. The dry blend, weighing 600 grams, was mixed with 147 ml. of water for 3 minutes in a HOBART mixer. The cementitious mixture was poured into a 40×40×160 mm mold and was cured in a plastic bag for 28 days. The wet compressive strength of the cementitious mixture, over time, is presented in Table 12.

TABLE 11

| Composition # 10 | Weight % |
|---|---|
| White Portland Cement | 13.8 |
| Gypsum | 0.5 |
| Beta - Hemihydrate | 12 |
| Metakaolin | 4.2 |
| Silica Sand <200 microns | 69 |
| Retardant-P | 0.02 |
| Melment F-10 | 0.5 |

TABLE 12

Wet Compressive Strength of Composition #10

| | Compressive Strength (Mpa) |
|---|---|
| 10 Hours | 5.4 |
| 1 Day | 5.3 |
| 7 Days | 40 |
| 14 Days | 48 |
| 28 Days | 50.4 |

EXAMPLE 3

An exemplary composition according to the present invention is provided in Table 13, and tested according to standard procedure EN-196-1.

The dry components were mixed thoroughly to obtain a homogeneous blend. The dry blend, weighing 1800 grams, was mixed with 900 ml. of water for 3 minutes in a HOBART mixer. The cementitious mixture was poured into a 40×40×160 mm mold and was cured in a plastic bag for 28 days. Both the wet and dry compressive strengths of the cementitious mixture, over time, are presented in Table 14. The compressive strength of an ordinary OPC mixture is provided for comparative purposes.

It is clearly evident from Table 14 that the cementitious mixture according to the present invention is fast-setting relative to the reference composition, and also demonstrates superior compressive strength after the first 7–14 days.

In addition to the enhanced physical properties described above, the use of calcined gypsum as a major component of the binder gives the cementitious mixture of the present invention a substantial economic advantage relative to cementitious mixtures according to the prior art.

It is evident from the above descriptions of the inventive cementitious mixtures and the physical characteristics thereof that these mixtures are particularly suitable where water resistance is an important consideration, such as for blocks, backer boards for baths and showers and floor underlay applications. Further uses of the inventive composition are for materials such as fiberboard, siding, trim boards, structural framing, self-leveling, and road patching materials.

Compositions made with binders according to the invention produce construction materials that set up quickly, exhibit high strength and durability, and display excellent water resistance. Products produced from compositions according to the invention can be produced on a continuous line. As these compositions set extremely quickly (typically in 2–10 minutes), building compositions made from such compositions can be handled much faster than products made from OPC alone.

TABLE 13

| | Composition # | |
| --- | --- | --- |
| | 5 Weight - % | 3A Weight - % |
| White Portland Cement | 11.5 | 25 |
| Beta - Hemihydrate | 10 | — |
| Metakaolin | 3.5 | — |
| Standard Sand EN-196-1 | 74.15 | 75 |
| Retardant-P | 0.05 | — |
| Melment F-10 | 0.8 | — |
| Water (%) | 50 | 50 |

Compositions made with binders according to the invention produce construction materials that set up quickly, exhibit high strength and durability, and display excellent water resistance. Products produced from compositions according to the invention can be produced on a continuous line. As these compositions set extremely quickly (typically in 2–10 minutes), building compositions made from such compositions can be handled much faster than products made from OPC alone.

It will be appreciated that the above descriptions are intended only to serve as examples, and that many other embodiments are possible within the spirit and the scope of the present invention.

TABLE 14

Compressive Strength according to EN-196-1

| | Sample No. | |
| --- | --- | --- |
| | 5 | 3A |
| | Compressive Strength (Mpa) | |
| | wet | dry |
| Hours | | |
| ½ | 2.2 | 0 |
| 1 | 2.4 | 0 |
| 3 | 2.5 | 0 |
| 6 | 2.7 | 0 |
| 24 | 12.9 | 12.9 |
| Days | | |
| 3 | 26.2 54.7 | 29.5 |
| 14 | 68.2 74.1 | 49 |
| 28 | 67.2 78.6 | 53 |

What is claimed is:

1. A fast-setting, waterproof cementitious material comprising:

(a) Ordinary Portland Cement (OPC);

(b) calcium sulfate hemihydrate;

(c) amorphous silica;

(d) amorphous alumina;

wherein the ratio of calcium sulfate hemihydrate to OPC is about 0.7:1.0 to 1.4:1.0, the ratio of amorphous silica and amorphous alumina to OPC is about 0.26:1.0 to 0.4:1.0 and wherein the ratio of amorphous alumina to amorphous silica is about 0.3:1.0 to 1.5:1.0.

2. The cementitious material of claim 1, wherein the ratio of calcium sulfate hemihydrate to OPC is about 0.75:1.0 to 1.1:1.0.

3. The cementitious material of claim 1, further comprising up to about 95% by weight of filler selected from the group consisting of pozzolanic aggregate, non-pozzolanic aggregate, and fibers.

4. The cementitious material of claim 1 wherein said amorphous alumina is provided from metakaolin.

5. The cementitious material of claim 1 wherein said amorphous alumina is provided from calcined clay.

6. The cementitious material of claim 1 wherein said amorphous silica is provided from materials selected from the group consisting of silica fume, rice-husk ash, calcined clay and metakaolin.

7. The cementitious material of claim 3, wherein amounts of said OPC, said calcium sulfate hemihydrate, said amorphous silica, said amorphous alumina, and said filler are selected such that said material has a compressive strength of at least about 300 PSI after 10–60 minutes and an ultimate compressive strength of at least about 4,500 PSI after 28 days.

8. The cementitious material of claim 3, wherein amounts of said OPC, said calcium sulfate hemihydrate, said amorphous silica, said amorphous alumina, and said filler are selected such that said material has a compressive strength of at least about 300 PSI after 10–60 minutes and an ultimate compressive strength of at least about 7,000 PSI after 28 days.

9. The cementitious material of claim 3, wherein amounts of said OPC, said calcium sulfate hemihydrate, said amorphous silica, said amorphous alumina, and said filler are selected such that said material has a compressive strength of at least about 300 PSI after 10–60 minutes and an ultimate compressive strength of at least about 12,000 PSI after 28 days.

10. A fast-setting, waterproof cementitious material comprising:
   (a) about 35–55% by weight Ordinary Portland Cement (OPC);
   (b) about 35–52% by weight calcium sulfate hemihydrate;
   (c) about 5–12% by weight amorphous silica;
   (d) about 3–9% by weight amorphous alumina.

11. The cementitious material of claim 10 further comprising filler selected from the group consisting of pozzolanic aggregate, non-pozzolanic aggregate, and fibers, and wherein said cementitious material contains up to about 95% by weight of said filler.

12. The cementitious material of claim 11, wherein amounts of said OPC, said calcium sulfate hemihydrate, said amorphous silica, said amorphous alumina, and said filler are selected such that said material has a compressive strength of at least about 300 PSI after 10–60 minutes and an ultimate compressive strength of at least about 4,500 PSI after 28 days.

13. The cementitious material of claim 11, wherein amounts of said OPC, said calcium sulfate hemihydrate, said amorphous silica, said amorphous alumina, and said filler are selected such that said material has a compressive strength of at least about 300 PSI after 10–60 minutes and an ultimate compressive strength of at least about 7,000 PSI after 28 days.

14. The cementitious material of claim 11, wherein amounts of said OPC, said calcium sulfate hemihydrate, said amorphous silica, said amorphous alumina, and said filler are selected such that said material has a compressive strength of at least about 300 PSI after 10–60 minutes and an ultimate compressive strength of at least about 12,000 PSI after 28 days.

* * * * *